Patented July 4, 1950

2,514,299

UNITED STATES PATENT OFFICE 2,514,299

PRODUCTION OF MERCAPTANS

Simpson D. Sumerford, Baton Rouge, La., assignor to Standard Oil Development Company, a corporation of Delaware No Drawing. Application July 25, 1946, Serial No. 686,157

2 Claims. (Cl. 260—609)

This invention relates to a process for the preparation of mercaptans from alcohols and has particular application to the preparation of mercaptans by the reaction of elemental sulfur and hydrogen with alcohols.

Mercaptans are valuable intermediates for the preparation of many chemical compounds. Mercaptans, and particularly those having a high molecular weight, are becoming increasingly important in a variety of chemical products and processes. Since synthetic rubber has come into wide use, such mercaptans have increased in importance due to the superior qualities they impart to synthetic rubber when they are present as ingredients in polymerization reaction mixtures. They are also used in the compounding of various rubber-like substances because of the desirable properties they impart to the cured product. These and like uses of mercaptans have reached such importance that an inexpensive and readily available source of major amounts of mercaptans is desirable. Alcohols are an economically suitable and readily available starting material for the preparation of mercaptans. Alcohols have been converted to mercaptans by the use of phosphorous trisulfide but the yield is poor. The replacement of oxygen in alcohols by sulfur has been accomplished by passing a mixture of hygrogen sulfide and alcohol vapor over thoria heated to 300 to 350° C. but substantial amounts of dialkyl sulfides are formed in this process with the resultant lowering of the yield of mercaptans. R. L. Kramer and E. E. Reid (J. A. C. S., 43, 880 (1921)) passed alcohols up to $C_5$ as a vapor with hydrogen sulfide over thoria and obtained a yield of mercaptan of less than 50% with the exception of n-butyl mercaptan and here the yield was only slightly better. The corresponding aldehydes were obtained as by-products up to 15.9% and a small amount of olefin was generally produced. There was no analysis for sulfides made, although a large amount of reaction product was not accounted for in the above figures. J. Y. Johnson, in the British Patent No. 454,668, led alcohol vapor and hydrogen sulfide over a catalyst known to assist in splitting off water, such as an oxide or salt of various metals, either alone or as a mixture of more than one such substance and supported or unsupported. He reported olefins and sulfides as by-products. An additional disadvantage of this method of replacing the oxygen in an alcohol with sulfur is that the narrow temperature range makes this method applicable only to a limited number of alcohols without the use of expensive and special equipment. The use of gaseous hydrogen sulfide has undesirable features in that it is relatively expensive and hazardous to use.

This invention has as an object the preparation of mercaptans from alcohols.

This invention has for another object the preparation of mercaptans from alcohols by the use of elemental sulfur and hydrogen and a hydrogenating catalyst.

This invention has as still another object the preparation of mercaptans from alcohols by replacing the oxygen of the alcohol with sulfur by a process which avoids the use of gaseous hydrogen sulfide.

Other objects and a fuller understanding of the invention may be had by referring to the following description and claims.

These objects are accomplished by the following invention wherein alcohols are converted to mercaptans by heating the alcohol with elemental sulfur and hydrogen in the presence of a hydrogenating catalyst. The temperature of the reaction is substantially within the range of from 400–700° F. In practicing the invention it is preferable to introduce the alcohol, sulfur and catalyst into a pressure vessel and then introduce the hydrogen and maintain the pressure within the reaction vessel throughout the course of the reaction at a pressure within the range of from 500–2000 lbs. per sq. in. gage, although higher pressures are not objectionable. The time required to obtain the maximum yield of mercaptan depends upon the alcohol or alcohols used and the amounts of reactants in the reaction chamber. It may be necessary to add additional amounts of hydrogen during the course of the reaction to maintain the pressure within the desired range. Upon completion of the reaction the excess hydrogen is allowed to escape and the reaction mixture is filtered from any insoluble catalyst or other insoluble materials present; it may then be distilled in any suitable distillation apparatus to separate unreacted alcohol or alcohols from the mercaptan formed. As an alternate procedure an inert gas is passed through the liquid reaction mixture to remove unreacted hydrogen sulfide.

This invention contemplates the use of aliphatic alcohols and aryl alkyl alcohols; it is not restricted in scope to any particular molecular weight of alcohols and is applicable to simple low molecular weight straight chain alcohols as well as to branched chain, secondary, tertiary and high molecular weight alcohols. This invention is applicable to the preparation of the corresponding mercaptans from the butyl alcohols and from higher molecular weight alcohols containing up to 20 or more carbon atoms per molecule, and is especially suitable for use with alcohols of 8 to 16 carbon atoms. It is to be understood that the conditions of reaction as regards time, temperature and pressure will necessarily vary according to the alcohol used. A mixture of alcohols may be used in practicing this invention and in this case the resulting product will be a mixture of mercaptans.

*Example 1*

50 grams of powdered sulfur and 244 grams of "Lorol," a mixture of straight chain primary alcohols, containing alcohols having from 10 to 16 carbon atoms with an average of 12 carbon atoms, were heated in the presence of hydrogen and a hydrogenating catalyst to 600° F. and a pressure of 1200 lbs. per sq. in. gage. The liquid product was freed of dissolved hydrogen sulphide by washing with water. An analysis of the reaction product which was freed from hydrogen sulphide showed 6% of sulfur which corresponds to an approximate yield of mercaptans of 40%. The liquid product was distilled at 6 m. m. with the following results:

| Cut No. | Boiling Range in Degrees F. | Vol. Per Cent | Wt. Per Cent of S | Mercaptan, Qualitative |
|---|---|---|---|---|
| 1 | Initial-240 | 0.5 | | − |
| 2 | 240-340 | 83.0 | 6.02 | + |
| 3 | Bottoms | 14.0 | 6.04 | + |
| | Recovery, Per Cent | 97.5 | | |

*Example 2*

50 grams of powdered sulfur and 244 grams of a mixture of alcohols, the same as the mixture used in Example 1, were heated with an excess of hydrogen in the presence of an active hydrogenating catalyst. The maximum temperature was 650° F. and the maximum pressure was 1950 lbs. per sq. in. gage. The reaction product was freed from hydrogen sulphide by washing with water, and an analysis of sulfur showed a 6% yield of mercaptans.

| Cut No. | Boiling Range in Degrees F. | Vol. Per Cent | Wt. Per Cent of S | Mercaptan, Qualitative |
|---|---|---|---|---|
| 1 | Initial-240 | 64.7 | 0.85 | + |
| 2 | 240-340 | 28.2 | 1.58 | + |
| 3 | Bottoms | 4.1 | 4.29 | + |
| | Recovery, Per Cent | 97.0 | | |

The catalyst used in the above examples was $TiO_2$ gel. Examples of other suitable hydrogenation catalysts are metallic iron, cobalt and nickel and sulfides thereof.

It will be seen from the above description of the invention that mercaptans are prepared from alcohol without the use of gaseous hydrogen sulphide by using relatively inexpensive elemental sulfur and hydrogen, thus avoiding hazards present when gaseous hydrogen sulphide is used.

While the above examples describe this process as conducted in batch operation with catalyst and reagents in a bomb or autoclave, the process may also be conducted in a continuous manner in which the reagents are passed through a reaction zone which may contain the catalyst. The catalyst may be suitably fixed in this zone in the form of beds or layers or it may be suspended as finely divided solid particles in a "fluidized" form in a rising stream of the reagents. In such operation, catalyst may be continuously or intermittently withdrawn from the reaction zone, passed through suitable heating and/or regeneration zones and returned to the reaction zone in order to control the temperature and the extent of the reaction proceeding therein.

The above description and examples are intended to be illustrative only. Any modification or variation therefrom which conforms to the spirit of the invention is intended to be included within the scope of the claims.

What is claimed and sought to be secured by Letters Patent is:

1. A process for the preparation of aliphatic mercaptans which comprises heating mixed aliphatic straight chain, primary, monohydric alcohols having from 8 to 16 carbon atoms, elemental sulfur, and hydrogen in the presence of a $TiO_2$ gel hydrogenating catalyst at temperatures of 400°–700° F. and pressures within the range of 500 to 2,000 lbs. per sq. in. gage.

2. A process for the preparation of aliphatic mercaptans which comprises heating aliphatic straight chain, primary, monohydric alcohols containing from 10 to 16 carbon atoms per molecule, elemental sulfur, and hydrogen, at about 600° F. and 1200 lbs. per sq. in. gage in the presence of a $TiO_2$ gel as a hydrogenating catalyst.

SIMPSON D. SUMERFORD.

REFERENCES CITED

The following references are of record in the file of this patent:

UNITED STATES PATENTS

| Number | Name | Date |
|---|---|---|
| 2,070,761 | Szeszich | Feb. 16, 1937 |
| 2,116,182 | Baur | May 3, 1938 |
| 2,402,613 | Ferlow | June 25, 1946 |
| 2,402,640 | Lazier et al. | June 25, 1946 |

OTHER REFERENCES

Catalysis, Berkman et al., 1940, pages 281–282.
Richter's Organic Chemistry, vol. 1, 1919, page 142.